Sept. 29, 1970 R. J. MILLS Re. 26,955

INDUSTRIAL DUST-MOP CLEANER

Original Filed Aug. 22, 1966

INVENTOR.
ROBERT J. MILLS
BY Meyers & Peterson
ATTORNEYS

United States Patent Office

Re. 26,955
Reissued Sept. 29, 1970

26,955

INDUSTRIAL DUST-MOP CLEANER

Robert J. Mills, 1329 Weber Drive,
Clearwater, Fla. 33516

Original No. 3,411,175, dated Nov. 19, 1968, Ser. No. 574,102, Aug. 22, 1966. Application for reissue Jan. 13, 1969, Ser. No. 799,145
Int. Cl. A47l 7/00
U.S. Cl. 15—311 4 Claims

Matter enclosed in heavy brackets [ ] appears in the original patent but forms no part of this reissue specification; matter printed in italics indicates the additions made by reissue.

ABSTRACT OF THE DISCLOSURE

Apparatus for cleaning industrial dust-mops having frame means defining an enclosed dust-receiving chamber therewithin, vertically adjustable mop-receiving channel means disposed adjacent the top surface of the dust-receiving chamber and having an air ingress port to permit transfer of environmental air to the dust-receiving chamber, a pair of counter-rotating brushes disposed within the chamber and having a peripheral surface extending adjacent to the mop-receiving channel, the brushes being rotated along an axis which is generally transverse to the elongated axis of the mop-receiving channel, and fan means within the dust-receiving chamber for exhausting air from the dust-receiving chamber, filter means being provided to remove dust from the air being exhausted.

The present invention relates generally to an improved industrial dust-mop cleaner, and more particularly to such a cleaner which is adapted to thoroughly clean and re-vitalize such a mop in a minimum period of time.

In the past, industrial dust-mops have generally been cleaned by laundering, or dry cleaning, this being followed by an application of an oil or other material for assisting the retention of dust within the mop strands. In accordance with the present invention, it has been determined that these dust mops, even when impregnated with a modest amount of oil or wax emulsion, may be cleaned mechanically on a dry basis, and the cleaning creates an absolute minimum of dust in the cleaning area.

Basically, in accordance with the present invention, an industrial dust-mop cleaner is provided which has an enclosure supported on frame means, along with an adjustable dust-mop receiving channel along the upper surface of the frame. The dust-mop receiving channel is provided with an opening through which communication may be made from the channel to a pair of counter-rotating brushes. These brushes are arranged in generally axially parallel relationship in order to form a bite zone therebetween with generally downward peripheral travel in the bite zone. The individual elongated strands which comprise the industrial dust-mop are then drawn into the bite zone, and brushed in order to remove any foreign particles including dust, debris, or the like, and thereby move this material into the interior of the enclosure or console. The enclosure or console is provided with an exhaust fan which moves environmental air inwardly through the opening in the mop receiving channel, and outwardly from an exhaust port which is separated from the main enclosure zone of the console by a suitable dust and lint filter. Thus, clean air is exhausted from the console, this being in the absence of entrained dust or the like.

Therefore, it is an object of the present invention to provide an improved industrial dust-mop cleaning apparatus which comprises an enclosure or console, the enclosure being provided with an adjustable dust-mop receiving channel which has a pair of counter-rotating brushes moving downwardly at the bite zone formed therebetween.

It is a further object of the present invention to provide an improved industrial dust-mop cleaner which comprises an enclosed console having an elongated dust-mop receiving channel along the upper surface thereof, the channel having an opening therein which communicates with a pair of counter-rotating brushes having an axis which is generally perpendicular to the axis of the dust-mop receiving channel, these brushes forming a bite zone with a downward direction of travel so as to capture the individual elongated soft woven or twisted strands of the dust-mop and clean them from entrained dust and debris.

Other and further objects of the present invention will become apparent from a study of the following specification, appended claims, and accompanying drawing wherein:

Figure 1:
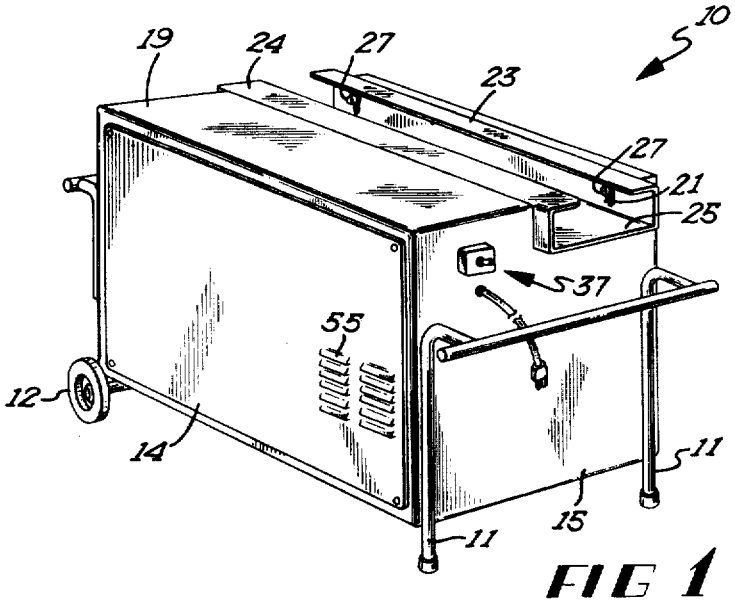
FIG. 1 is an isometric view of the industrial dust-mop cleaner of the present invention.

In accordance with the preferred modification of the present invention, the industrial dust-mop cleaner of the present invention is generally designated 10, and includes a frame or support system as shown at 11, and may optionally include a pair of rotatable support wheels 12—12. The cleaner is enclosed generally by the front panel 14, end panels 15 and 16, and a rear panel along with a suitable lower panel 18 and top surface 19. The top surface 19 has provided therein a vertically adjustable mop receiving channel generally designated 20 which has a pair of sidewalls 21 and 22 along with a pair of inwardly extending upper flange surfaces 23 and 24. The lower surface of the channel 20 is shown at 25, this surface having an opening along the center portion thereof as at 26. The bolts and nuts 27 provide for vertical adjustment of the channel 20, as desired, and the extent of the opening 26 is generally of such a size so as to accommodate the counter-rotating brushes shown at 28 and 29.

Figure 2:
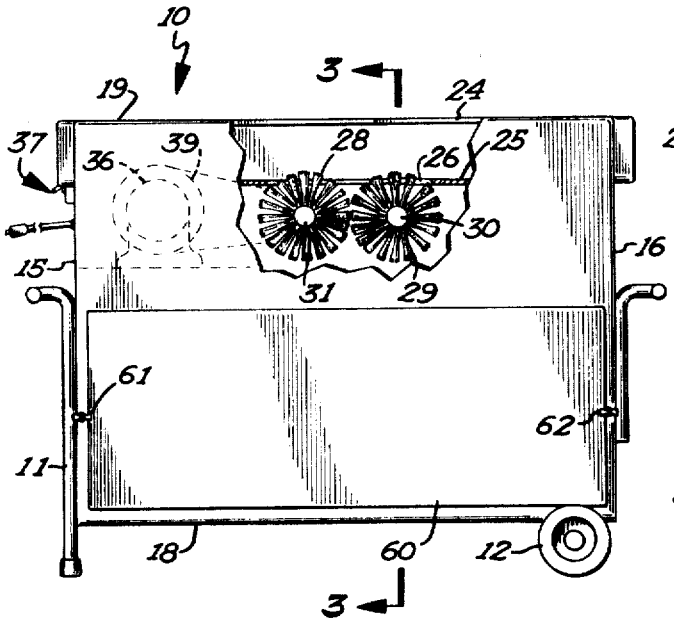
FIG. 2 is an elevational view of the rear side of the apparatus and showing, in partially broken away configuration, the arrangement of the brushes mounted therein.
Figure 3:
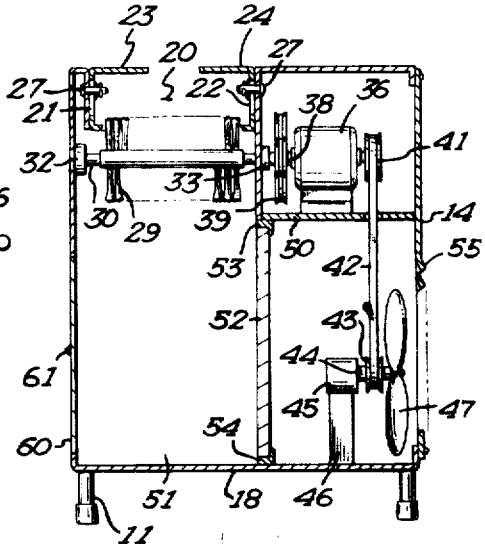
FIG. 3 is a vertical sectional view taken along the line and in the direction of the arrows 3—3 of FIG. 2.

Referring now in detail to the individual brushes 28 and 29, these brushes have an axis or central shaft as at 30 and 31, these axes being at 32 and 33 in connection with the shaft 30. Any suitable bushings or bearings may be employed, and are preferably mounted or secured to the panels or frame portions of the enclosure, such as is shown in FIG. 3. As indicated, bearing member 33 is actually mounted in the compartment area or zone which serves to isolate the motor 36 which is utilized to drive the brushes as well as other components of the system The power for the motor 36 is available through the combination of the cord and switch assembly shown in FIG. 1 and generally indicated at 37. As is indicated in FIG. 3 of the drawings, the motor 36 preferably has a double ended shaft, one portion of which is shown at 38 and having a belt receiving drive pulley 39 secured thereon. The drive pulley 39 is provided with a belt shown at 40, which belt is in turn coupled to a pulley 41 for driving the shaft 31 in a clockwise direction as shown in the view of FIG. 2. Suitable drive means are coupled between the shafts 30 and 31, to provide the counter rotation of the brushes such as, for example, a pair of peripherally contacting friction gears or the like, not shown.

At the other end of the double ended drive shaft from the motor 36, a second pulley is provided as at 41, this pulley having a belt 42 associated therewith for driving the pulley 43 which is secured to the fan shaft 44 journaled within the bearing head as at 45. A suitable support arrangement is provided as at 46 for mounting the journal head 45 to the base panel 18 or to the frame portions 11 of the enclosure.

As an alternative to the structure shown in FIG. 3, the motor 36 may be mounted along the base of the unit, and may accordingly be supplied with suitable pulley and belt arrangements for driving the individual brushes, and if desired, a suitable fan mechanism could be coupled directly to the opposite shaft portion of the motor. Such an arrangement will provide generally for more efficient cooling of the motor, when required. Of course, the motor chamber should reasonably be provided with suitable access ports or grills to receive filtered air such as along the surface 50, and also along the side panel 14, particularly in the motor compartment area.

In order to prevent the flow of dust outwardly from the chamber area 51 which is provided in the enclosure or console assembly, a suitable dust and lint filter 52 is interposed by suitable retaining channels or clearances 53 and 54, this filter preventing the outward movement or flow of dust from the area 51 through the unit and thus outwardly to the environment. Air flow generally moves outwardly from the grills as at 55 in the panel member 14.

Thus, the flow of air through the system while in operation, moves inwardly through the opening 26 in the dust-mop receiving channel, and thus into the confines of the dust retaining chamber 51. Subsequently, the air moves through the filter 52 and outwardly through the grill opening 55 under the influence of the fan shown at 47.

Particular attention is directed to FIG. 2 of the drawings wherein an inspecting panel shown generally at 60 is provided for permitting ready access to the chamber 51 to permit removal of entrapped debris. The panel 60 may be readily removed and replaced by means of the wing nuts shown generally at 61 and 62. The panel member 60 is preferably gasketed to the remaining portions of the frame and enclosure, although this is not a specific requirement provided the panel 60 fits reasonably firmly onto the mating portions of the enclosure.

In operation, the operator introduces the mop head into the properly adjusted channel 20 and base 25 and moves the mop in the direction of the opening 26, until the leading edge thereof comes into contact with the counter-rotating brushes 28 and 29. The individual elongated soft woven or twisted strands are then grasped by the individual elements of the brushes 28 and 29, and moved and combed in a downwardly direction by the brushes. Generally, these strands are from 6 inches to 12 inches long, and the brushes accordingly are of a diameter such that the minimum strand length will move at least through the bite area or zone formed at the tangential juncture of the brushes 28 and 29. Dust, lint, debris, waste particles and the like, are then transferred under the influence of the combing action of the brushes 28 and 29 into the dust and waste receiving zone 51. The extensive combing and brushing action on the individual strands will promote a simple cleaning of the strands without necessarily requiring laundering or immersion in a dry cleaning solvent. In addition, the design arrangement is such that the operator, on providing downward pressure along the channel in the area of the first contacted brush, will enhance the advancing motion of the mop as it moves along the cleaning station. By carefully controlling the travel or movement of the mop through the cleaner, a thorough cleaning job may be accomplished in this arrangement.

If desired after cleaning, the operator may wish to impregnate the individual strands with a small amount of oil or wax emulsion, such as is normally done at the time these heads are laundered or dry cleaned.

This apparatus has been found to be extremely effective in cleaning the industrial dust mops which are in common usage today, these mops normally comprising a head member, to which are secured a plurality of soft woven or twisted strands, these strands being individually secured to the head means.

It will be appreciated by those skilled in the art that the examples shown herein are for purposes of illustration only, and are not to be otherwise constructed as a limitation upon the scope to which this invention is otherwise entitled.

I claim:

1. In a dust-mop cleaner apparatus, the combination comprising;

(a) frame means defining an enclosure including a dust-receiving chamber therewithin;

(b) vertically adjustable mop receiving channel means disposed adjacent the top surface of said dust receiving chamber and having an air ingress port to transfer environmental air to said chamber;

(c) a pair of counter-rotating brushes disposed within said dust receiving chamber and each having a peripheral surface extending adjacent said mop receiving channel and forming a bite zone beneath said channel, said brushes being journaled for axial counter-rotation within said frame means, and having an axis of rotation which is generally transverse to the elongated axis of said mop receiving channel;

(d) fan means mounted within said enclosure and adjacent to said dust receiving chamber for exhausting air from said dust receiving chamber, and including filter means disposed between said fan means and said dust receiving chamber for cleaning the air moving through said dust receiving chamber, said fan means including an exhaust port adjacent thereto for exhausting filtered air from said enclosure.

2. The dust-mop cleaner as defined in claim 1 being particularly characterized in that said counter-rotating brushes are in generally tangential mutual contact, one with another.

3. The dust-mop cleaning apparatus as defined in claim 1 being particularly characterized in that the axial length of said counter-rotating brushes is generally substantially equal to the width of said mop receiving channel.

*4. In a dust-mop cleaner apparatus, the combination comprising:*

*(a) frame means defining an enclosure including a dust-receiving chamber therewithin;*

*(b) mop receiving channel means disposed adjacent the top surface of said dust receiving chamber and having an air ingress port to transfer environmental air to said chamber, said channel having an elongated axis and a lower mop supporting surface with said air ingress port being formed therein generally midway between the ends thereof;*

*(c) a pair of counter-rotating brushes disposed within said dust receiving chamber and each having a peripheral surface extending adjacent said mop receiving channel and forming a bite zone beneath the air ingress port formed in said channel, said brushes being journaled for axial counter-rotation within said frame means, and having an axis of rotation which is generally transverse to the elongated axis of said mop receiving channel;*

*(d) fan means mounted within said enclosure and adjacent to said dust receiving chamber for exhausting air from said dust receiving chamber, and including filter means disposed between said fan means and*

*said dust receiving chamber for cleaning the air moving through said dust receiving chamber, said fan means including an exhaust port adjacent thereto for exhausting filtered air from said enclosure.*

References Cited

The following references, cited by the Examiner, are of record in the patented file of this patent or the original patent.

UNITED STATES PATENTS

| | | | |
|---|---|---|---|
| 1,914,295 | 6/1933 | Riley | 15—311 |
| 2,625,704 | 1/1953 | Cudy | 15—311 |
| 2,642,600 | 6/1953 | Jones | 15—311 X |
| 3,015,121 | 1/1962 | Ulrich | 15—311 |

ROBERT W. MICHELL, Primary Examiner